(12) United States Patent
Hiroike et al.

(10) Patent No.: US 9,277,165 B2
(45) Date of Patent: Mar. 1, 2016

(54) VIDEO SURVEILLANCE SYSTEM AND METHOD USING IP-BASED NETWORKS

(75) Inventors: Atsushi Hiroike, Kawagoe (JP); Tatsuhiko Kagehiro, Kokubunji (JP); Naoto Akira, Kokubunji (JP); Kunihiko Toumura, Hachioji (JP); Takehiro Urano, Kokubunji (JP)

(73) Assignee: HITACHI, LTD., Tokyo (JP)

( * ) Notice: Subject to any disclaimer, the term of this patent is extended or adjusted under 35 U.S.C. 154(b) by 1047 days.

(21) Appl. No.: 12/350,512

(22) Filed: Jan. 8, 2009

(65) Prior Publication Data

US 2009/0185784 A1    Jul. 23, 2009

(30) Foreign Application Priority Data

Jan. 17, 2008   (JP) ................................ 2008-007934

(51) Int. Cl.
| | |
|---|---|
| H04N 9/47 | (2006.01) |
| H04N 5/77 | (2006.01) |
| G08B 13/196 | (2006.01) |
| G06F 17/30 | (2006.01) |
| H04N 5/76 | (2006.01) |

(Continued)

(52) U.S. Cl.
CPC .......... *H04N 5/772* (2013.01); *G06F 17/30793* (2013.01); *G06F 17/30811* (2013.01); *G08B 13/1968* (2013.01); *G08B 13/19608* (2013.01); *G08B 13/19656* (2013.01); *G08B 13/19663* (2013.01); *G08B 13/19671* (2013.01); *G08B 13/19682* (2013.01); *H04N 5/76* (2013.01); *H04N 5/765* (2013.01); *H04N 5/91* (2013.01)

(58) Field of Classification Search
CPC ................... G08B 13/19656; G08B 13/19608; G08B 13/19682; G08B 13/1968; G08B 13/19671; G08B 13/19663
USPC .......................................................... 348/143
See application file for complete search history.

(56) References Cited

U.S. PATENT DOCUMENTS

| | | | | |
|---|---|---|---|---|
| 5,012,522 | A | * | 4/1991 | Lambert ........................ 382/118 |
| 5,917,958 | A | * | 6/1999 | Nunally et al. ............... 382/276 |
| 6,081,206 | A | * | 6/2000 | Kielland ....................... 340/937 |

(Continued)

FOREIGN PATENT DOCUMENTS

| | | |
|---|---|---|
| JP | 2001-292441 | 10/2001 |
| JP | 2002247566 | 8/2002 |

(Continued)

*Primary Examiner* — Blake Rubin
(74) *Attorney, Agent, or Firm* — Brundidge & Stanger, P.C.

(57) ABSTRACT

A technique capable of preventing an increase in the load of a system and a IP-based network that perform both a process of transmitting information in real time and a process of storing and searching history information and of improving the scalability of the system. A video surveillance system includes: plural cameras that capture images; a monitoring apparatus that displays the images captured by the cameras; an information generating apparatus that generates information for searching the images captured by the cameras; and a search apparatus that searches the images captured by the cameras. The information generating apparatus acquires the images captured by the cameras, generates retrieval data from the acquired images, and transmits the generated retrieval data to the search apparatus. The search apparatus stores the retrieval data received from the information generating apparatus in a storage device, and notifies the monitoring apparatus that the retrieval data has been stored.

10 Claims, 6 Drawing Sheets

(51) Int. Cl.
*H04N 5/765* (2006.01)
*H04N 5/91* (2006.01)

(56) References Cited

U.S. PATENT DOCUMENTS

| | | | |
|---|---|---|---|
| 6,185,314 B1* | 2/2001 | Crabtree et al. | 382/103 |
| 6,504,479 B1* | 1/2003 | Lemons et al. | 340/541 |
| 6,583,813 B1* | 6/2003 | Enright et al. | 348/150 |
| 6,970,183 B1* | 11/2005 | Monroe | 348/143 |
| 7,460,149 B1* | 12/2008 | Donovan et al. | 348/143 |
| 7,791,466 B2* | 9/2010 | Agarwalla et al. | 340/517 |
| 7,907,750 B2* | 3/2011 | Ariyur et al. | 382/103 |
| 2002/0063777 A1 | 5/2002 | Maekawa et al. | |
| 2003/0093810 A1 | 5/2003 | Taniguchi | |
| 2004/0001142 A1* | 1/2004 | Kumhyr | 348/143 |
| 2004/0008253 A1* | 1/2004 | Monroe | 348/143 |
| 2004/0032494 A1* | 2/2004 | Ito et al. | 348/152 |
| 2004/0233983 A1* | 11/2004 | Crawford et al. | 375/240.01 |
| 2004/0240542 A1* | 12/2004 | Yeredor et al. | 375/240.01 |
| 2004/0263625 A1* | 12/2004 | Ishigami et al. | 348/152 |
| 2005/0018049 A1 | 1/2005 | Falk | |
| 2005/0046699 A1* | 3/2005 | Oya et al. | 348/207.1 |
| 2005/0177859 A1* | 8/2005 | Valentino et al. | 725/105 |
| 2005/0285941 A1* | 12/2005 | Haigh et al. | 348/155 |
| 2006/0078047 A1* | 4/2006 | Shu et al. | 375/240.01 |
| 2006/0238616 A1* | 10/2006 | Curtner et al. | 348/143 |
| 2006/0239645 A1* | 10/2006 | Curtner et al. | 386/95 |
| 2007/0013776 A1* | 1/2007 | Venetianer et al. | 348/143 |
| 2007/0052803 A1* | 3/2007 | Chosak et al. | 348/143 |
| 2007/0206834 A1 | 9/2007 | Shinkai et al. | |
| 2007/0257986 A1* | 11/2007 | Ivanov et al. | 348/154 |
| 2008/0211904 A1* | 9/2008 | Kato et al. | 348/143 |
| 2008/0252723 A1* | 10/2008 | Park | 348/143 |
| 2009/0141939 A1* | 6/2009 | Chambers et al. | 382/103 |
| 2010/0026802 A1* | 2/2010 | Titus et al. | 348/143 |

FOREIGN PATENT DOCUMENTS

| | | |
|---|---|---|
| JP | 2003030243 | 1/2003 |
| JP | 2003134435 | 5/2003 |
| JP | 2005045550 | 2/2005 |
| JP | 2006086991 | 3/2006 |
| JP | 2006174285 | 6/2006 |
| JP | 2007020057 | 1/2007 |

* cited by examiner

VIDEO SURVEILLANCE SYSTEM AND METHOD USING IP-BASED NETWORKS

CLAIM OF PRIORITY

The present application claims priority from Japanese patent application JP 2008-007934 filed on Jan. 17, 2008, the content of which is hereby incorporated by reference into this application.

FIELD OF THE INVENTION

The present invention relates to a video surveillance system including plural cameras.

BACKGROUND OF THE INVENTION

The development of an IP-enabled imaging apparatus, such as a Web camera, makes it possible to construct a wide and large-scale monitoring system using an IP-based network. In addition, a reduction in the cost of a hard disk device and an increase in the capacity of the hard disk device make it possible to store images captured by the monitoring system for a long time. In recent years, there is an increasing demand for a search technique capable of searching desired data from the stored image data.

As a technique for searching images, there is a similarity search technique based on image features. In the search technique, an image feature, which is a numerical vector representing information, such as a color and a shape, is extracted from a frame image of a video, which is a search target, and the image feature is stored as retrieval data in a database. During a search, a distance between the image feature extracted from the image selected by the user and the image feature stored in the database in a vector space is evaluated. An image having a short distance between the image features is determined as a similar image, and is returned as the search result.

SUMMARY OF THE INVENTION

When the similarity search technique is implemented in the wide and large-scale monitoring system using the IP-based network, it is necessary to generate retrieval data (image feature) from the images captured by plural cameras and store the retrieval data in a database. As a result, the amount of computation required to extract the image feature and store the image feature in the database is increased. Therefore, it is necessary to reduce the amount of computation required for the search system to perform the extraction and the storage of the image feature.

In addition, since an inexpensive camera sold on the market generally has a small amount of computation resource, it is difficult for the camera to process a large load.

The video surveillance system for moving pictures needs to perform both a process of transmitting information in real time and a process of storing and searching history information.

According to an aspect of the invention, a video surveillance system includes: plural cameras that capture images; a monitoring apparatus that displays the images captured by the cameras; an information generating apparatus that generates information for searching the images captured by the cameras; and a search apparatus that searches the images captured by the cameras. The information generating apparatus acquires the images captured by the cameras, generates retrieval data from the acquired images, and transmits the generated retrieval data to the search apparatus. The search apparatus stores the retrieval data received from the information generating apparatus in a storage device, and notifies the monitoring apparatus that the retrieval data has been stored.

According to the above-mentioned aspect of the invention, it is possible to prevent an increase in the load of a search system and improve the scalability of the system. In addition, it is possible to seamlessly search history information and real-time information.

DETAILED DESCRIPTION OF THE PREFERRED EMBODIMENTS

Hereinafter, exemplary embodiments of the invention will be described with reference to the accompanying drawings.

First Embodiment

Figure 1:
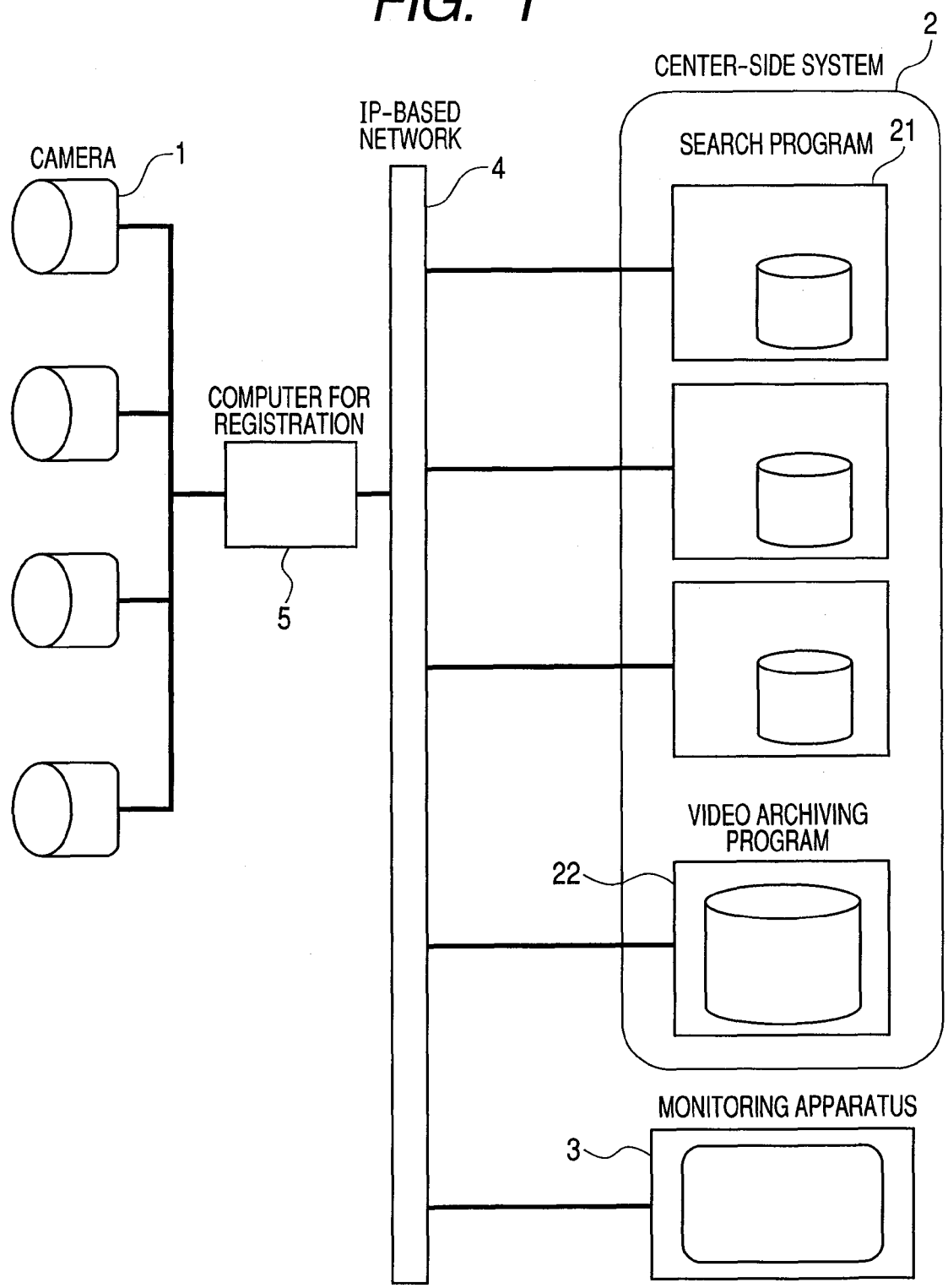
FIG. 1 is a block diagram illustrating the structure of a video surveillance system according to a first embodiment of the invention.

FIG. 1 is a block diagram illustrating the structure of a video surveillance system according to a first embodiment of the invention.

The video surveillance system according to the first embodiment includes plural cameras 1, a center-side system 2, a monitoring apparatus 3, an IP-based network 4, and a computer for registration 5.

The camera 1 includes an optical system including lenses, an imaging unit that converts an image into electric signals, and a network interface. For example, an IP camera that can be directly connected to an IP-based network may be used as the camera 1. The camera 1 is provided in an imaging target region, captures an image of the imaging target region, and transmits the captured image data to the computer for registration 5.

The computer for registration 5 is a computer including a processor, a memory, a storage device, and a network interface. The computer for registration 5 executes a program for image registration 100 (see FIG. 2) to extract an image feature from the image data captured by the camera 1. A motion detecting technique or a face detecting technique may be used to extract the image feature from image data of a predetermined motion or a predetermined face. In addition, the computer for registration 5 executes the program for image registration 100 to generate low-resolution image data (thumbnail data) from the captured image data. The extracted image feature and the generated low-resolution image data are transmitted to a search program 21 through the network 4.

One computer for registration 5 is shown in FIG. 1, but plural computers for registration 5 may be provided. The number of cameras connected to one computer for registration 5 may depend on the capacity of resources of the computer for registration 5.

The center-side system 2 includes at least one search program 21 and a video archiving program 22.

The computer for the search program 21 is a computer including a processor, a memory, a storage device, and a network interface, and stores the low-resolution image data and the image feature of the image data captured by the camera 1 in the storage device. The search program 21 searches the feature of the image data stored in the video archiving program 22 on the basis of a search request from the monitoring apparatus 3, and transmits the search results (the identifier of the image data and the low-resolution image data) to the monitoring apparatus 3. Plural search programs 21 may form a search program group. In addition, the search program 21 may transmit a signal for controlling the transmission bandwidth of the image data to the network 4.

Figure 2:
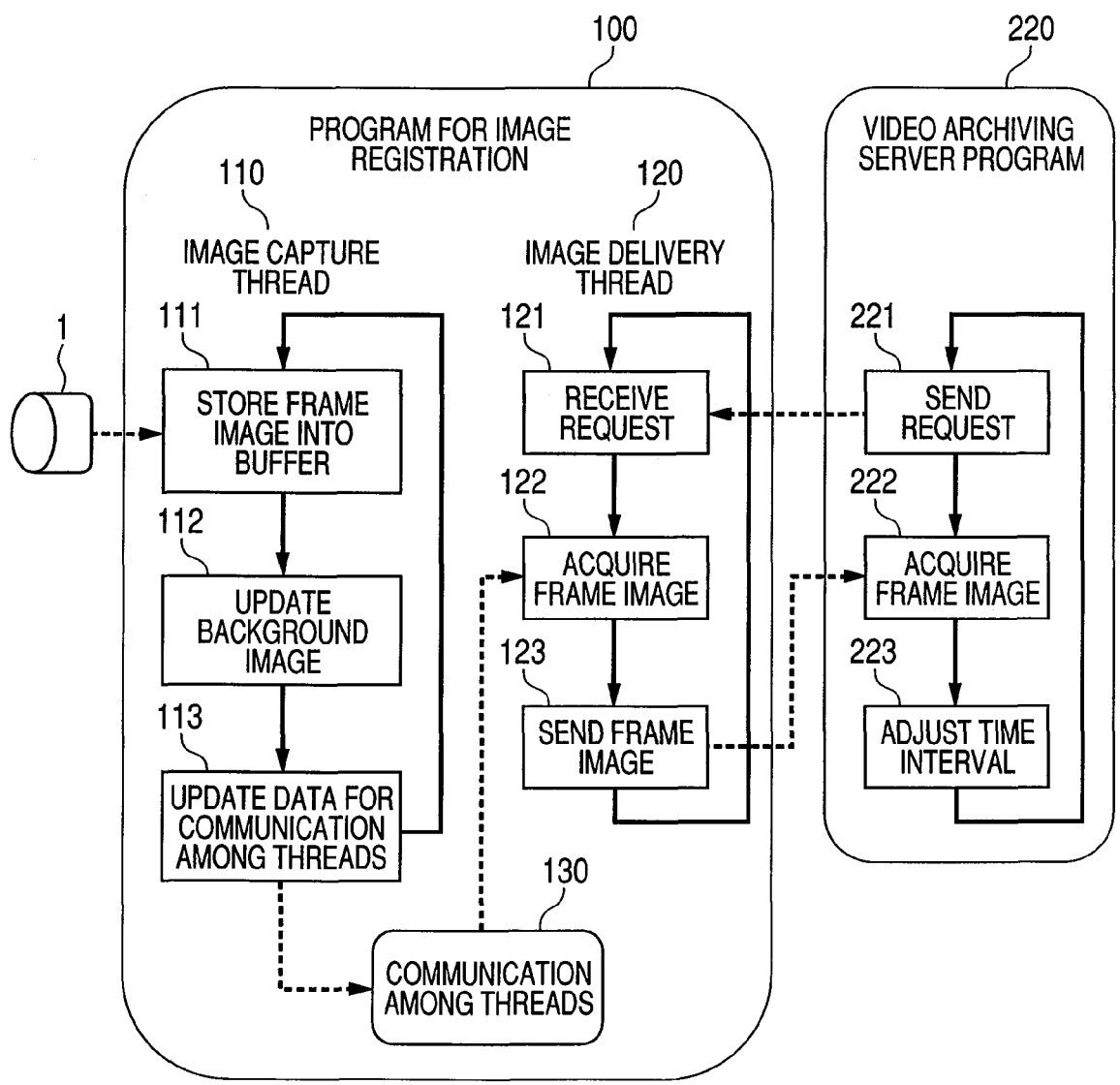
FIG. 2 is a diagram illustrating an image transmitting process of the video surveillance system according to the first embodiment of the invention.

The computer for the video archiving program 22 is a computer including a processor, a memory, a storage device, and a network interface, and executes a video archiving server program 220 (see FIG. 2). That is, the video archiving program 22 transmits a high-resolution image request to the computer for registration 5, acquires image (moving picture) data captured by the camera 1, and stores the acquired image data in the storage device. In addition, the video archiving program 22 transmits the stored image data to the monitoring apparatus 3 in response to a request from the monitoring apparatus 3. One video archiving program 22 is shown in FIG. 1, but plural video archiving programs 22 may be provided.

The monitoring apparatus 3 is a computer that includes a processor, a memory, a network interface, an operating unit, and a display unit and is operated by the operator of the video surveillance system. The monitoring apparatus 3 displays some image data selected from the image data captured by plural cameras 1 or all of the captured image data on the display unit (screen).

For example, the monitoring apparatus 3 transmits a search request input by the operator to the search program 21, and displays the search request and the search results. In addition, the monitoring apparatus 3 acquires image data (high-resolution data) corresponding to the search results from the video archiving program 22, the camera 1, or the computer for registration 5 and displays the acquired image data.

When the image feature extracted from the image data captured by the camera 1 satisfies predetermined conditions, the monitoring apparatus 3 displays image data (high-resolution data) from the camera 1 that captures the image data satisfying the conditions in real time. Another sensor (for example, an infrared sensor) provided in the imaging target region may be used to determine the display conditions of high-resolution image data. One monitoring apparatus 3 is shown in FIG. 1, but plural monitoring apparatuses 3 may be provided.

The cameras 1, the search programs 21, the video archiving program 22, and the monitoring apparatus 3 are connected to one another through the network 4. For example, an IP-based network that can transmit TCP/IP packets may be used as the network 4.

FIG. 2 is a diagram illustrating an image transmitting process of the video surveillance system according to the first embodiment of the invention.

The computer for registration 5 executes the program for image registration 100. In the program for image registration 100, three threads, that is, an image capture thread 110, an image delivery thread 120, and a retrieval data registration thread 140 (see FIG. 3) are executed in parallel. Each of the threads is repeatedly executed.

The computer for the video archiving program 22 executes the video archiving server program 220. The video archiving process 220 is repeatedly executed.

First, the process of the image capture thread 110 will be described.

The image capture thread 110 acquires the image data captured by an imaging element 11 of the camera 1, and stores the frame image into a buffer provided in a memory (111).

Then, the image capture thread uses the frame image stored in the buffer to calculate a background image having the average of the pixel values of a frame image sequence as a pixel value. Then, the image capture thread updates the previous background image with the newly calculated background image (112).

Then, the image capture thread calculates a background subtraction image having a difference between the frame image and the background image as a pixel value. Then, the image capture thread sets the calculated background subtraction image and the frame image to data transmitted by communication 130 between the threads (113).

Then, the image delivery thread 120 acquires the frame image using the communication 130 between the threads.

When receiving a request from the video archiving program 22 (121), the image delivery thread 120 acquires the latest frame image from data transmitted by the communication 130 between the threads (122), and transmits the acquired frame image to the video archiving program (123).

Next, the video archiving server program 220 executed by the video archiving program 22 will be described.

The video archiving program 22 transmits a high-resolution image request to the computer for registration 5 at a predetermined timing (for example, at a predetermined time interval, when an event is detected by another system) (221). When acquiring the image data captured by the camera 1 (222), the video archiving program adjusts the time interval of the acquired image data, and stores the acquired image data in the storage device (223). The adjustment of the time interval of the image data is performed by converting the format of the image data into a format suitable for the frame rate of the image data stored in the video archiving program 22 with reference to information (for example, the frame rate of the image data) included in the image data acquired from the computer for registration 5, and storing the converted image data. When the frame rate of the image data is converted from a high rate to a low rate, the remaining frames may be deleted. On the other hand, when the frame rate of the image data is converted from a low rate to a high rate, the previous and next images may be used to make up insufficient frames.

As described above, since the image data whose time interval is adjusted is stored in the storage device, it is possible to store image data having different frame rates in a unified format.

Figure 3:
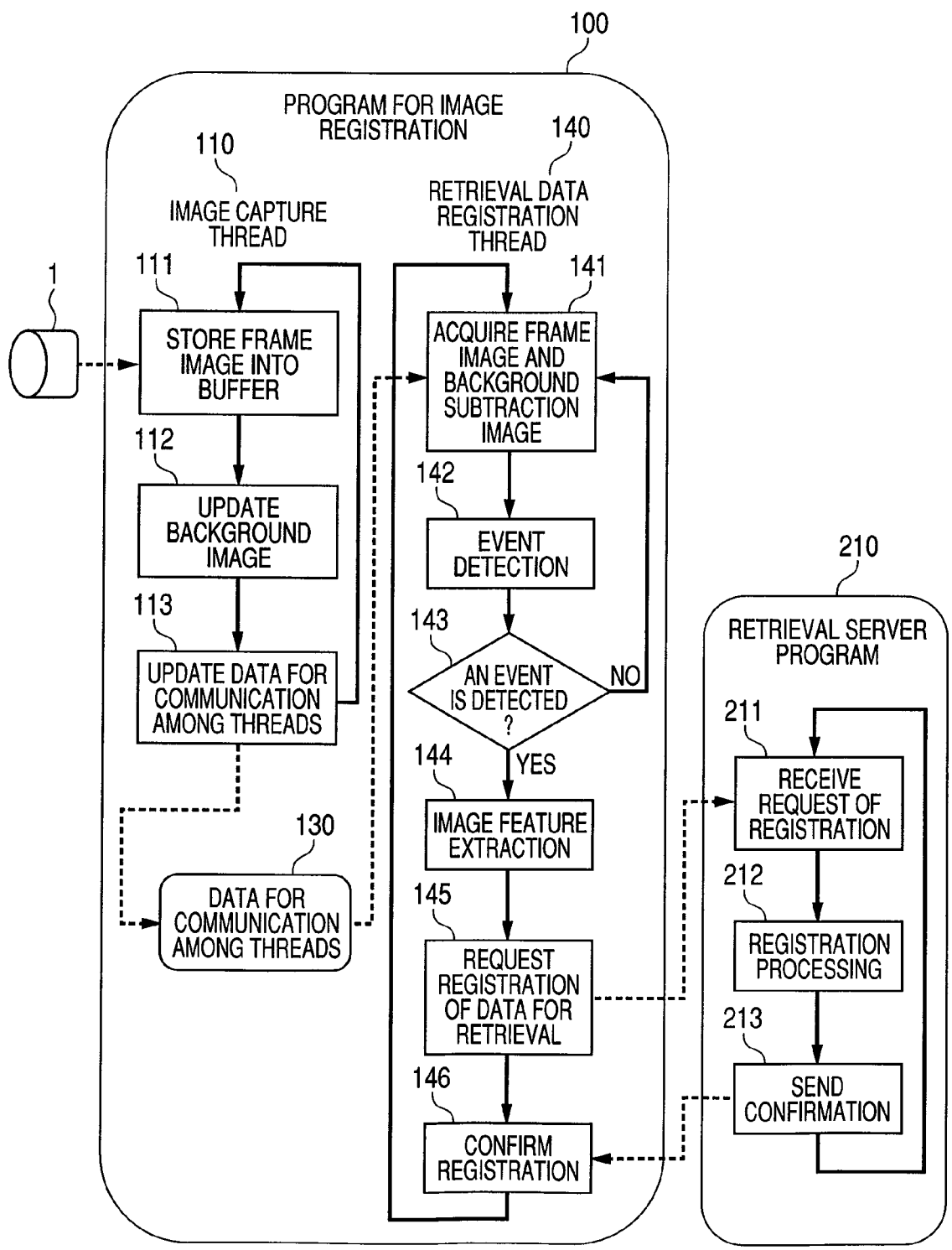
FIG. 3 is a diagram illustrating the outline of a retrieval data registration process of the video surveillance system according to the first embodiment of the invention.

FIG. 3 is a diagram illustrating the outline of a retrieval data registration process of the video surveillance system according to the first embodiment of the invention.

First, the process of the image capture thread 110 is the same as that shown in FIG. 2.

When acquiring data (the frame image and the background subtraction image) transmitted by the communication 130 between the threads (141), the retrieval data registration thread 140 performs an event detecting process 142 (FIG. 4) to detect an event. When no event is detected ("N" in 143), the retrieval data registration thread returns to Step 141 to acquire the next image. On the other hand, when an event is detected ("Y" in 143), the retrieval data registration thread extracts an image feature (144).

Then, the retrieval data registration thread transmits a request of registration of data for retrieval (2001 in FIG. 5) including the identifier of the original image data and the extracted feature to the search program 21 (145). The request of registration of data for retrieval may include the identifier of the camera 1 capturing the original image data as well as the identifier of the original image data. When receiving a retrieval data registration confirmation from the search program 21 (146), the retrieval data registration thread returns to Step 141 to acquire the next image.

Next, the search server program 210 executed by the search program 21 will be described.

When receiving a request of registration of data for retrieval from the computer for registration 5 (211), the search program 21 stores the received retrieval data (the image feature and the identifier of image data) in the storage device (212). Then, the search program sends a retrieval data registration confirmation to the computer for registration 5 (213). In addition, the computer for registration 5 transmits a registration event notice to the monitoring apparatus 3 after storing retrieval data, which will be described with reference to FIG. 5.

Figure 4:
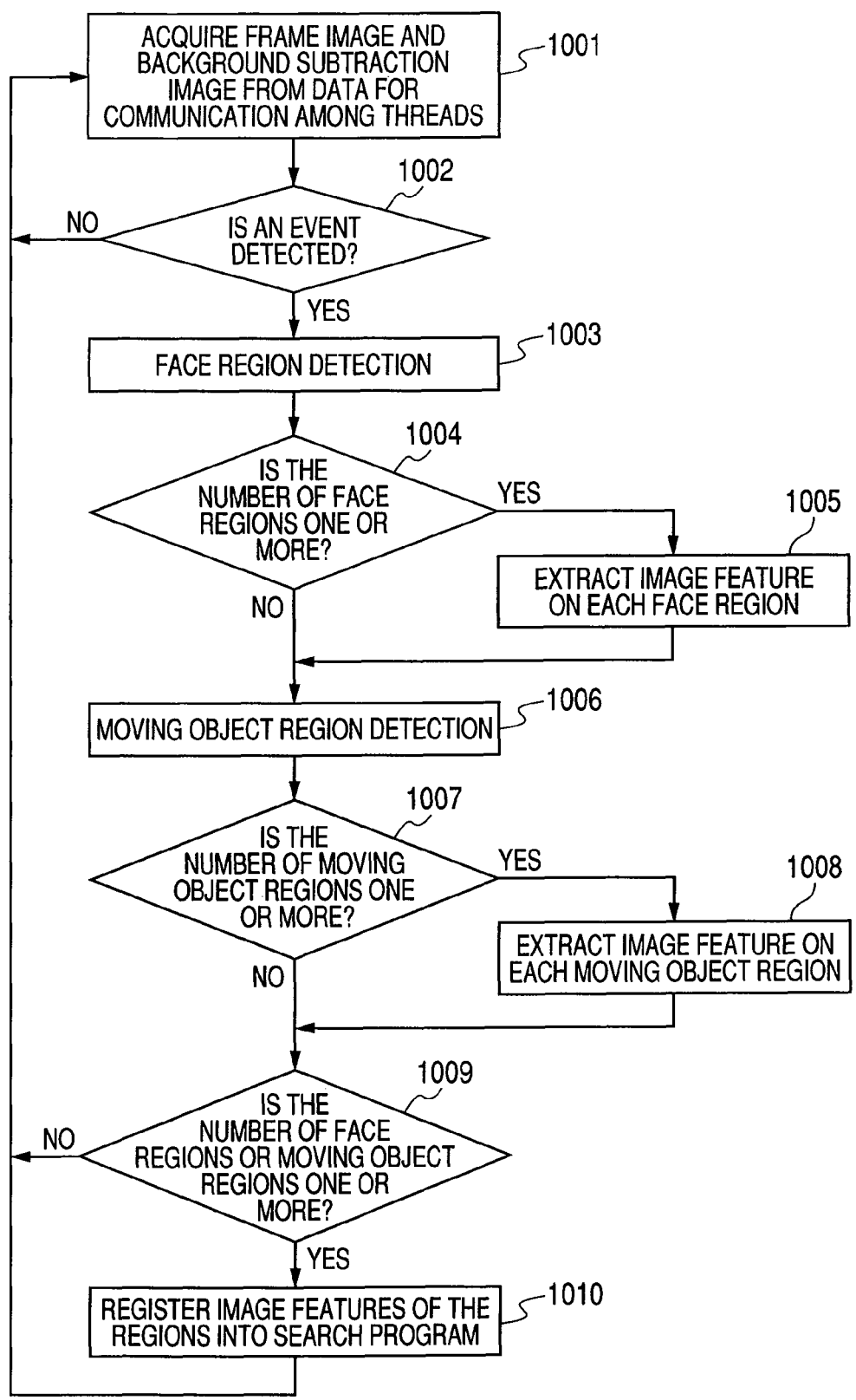
FIG. 4 is a flowchart illustrating the details of the retrieval data registration process of the video surveillance system according to the first embodiment of the invention.

FIG. 4 is a flowchart illustrating the details of a retrieval data registration process of the video surveillance system according to the first embodiment of the invention.

First, when acquiring the frame image and the background subtraction image transmitted by the communication 130 between the threads (1001), the retrieval data registration thread detects an event from the acquired image (1002). Specifically, the retrieval data registration thread calculates the sum of squares of the pixel values of the background subtraction image, and compares the calculated sum of squares with a predetermined threshold value to determine whether there is a motion component. As a result, when the calculated sum of squares of the pixel values is larger than the threshold value (there is a motion component), the retrieval data registration thread determines that an event has been detected.

Alternatively, the retrieval data registration thread may use face detection to detect an event, regardless of whether there is a motion component. A method that will be described in Step 1003 may be used to detect a face. When a face that is identical to the registered face is detected from the image, it may be determined that an event has been detected.

When no event is detected, the retrieval data registration thread returns to Step 1001 to acquire the next image. On the other hand, when an event is detected, the retrieval data registration thread proceeds to Step 1003 to extract an image feature from the frame image from which the event is detected. According to this structure that detects an event on the basis of whether there is a motion component before detecting a feature, it is not necessary to frequently perform an image feature detecting process requiring a large amount of computation, and it is possible to reduce the overall amount of computation.

In Step 1003, the retrieval data registration thread detects a face region from the frame image from which the event has been detected. OpenCV, which is a library of an open source, may be used to detect a face. The OpenCV is described in detail in the Intel homepage.

When the number of face regions is one or more ("Y" in 1004), the retrieval data registration thread extracts image features from the detected face regions (1005). An edge pattern feature may be used to detect the image feature of the face region. In order to extract the edge pattern feature, first, plural edge pattern features are set in advance. The face image is divided into a lattice, and the number of edge patterns in each region is counted. Then, histograms corresponding to the counted number of edge patterns are generated, and a multi-dimensional vector having a predetermined number of edge patterns as dimensions is generated, thereby generating a face image feature. Alternatively, the face image feature may be generated on the basis of eyes, a nose, and/or a mouth of the face.

Then, the retrieval data registration thread detects a moving object region from the frame image from which an event has been detected (1006). A frame difference method and/or a background difference method may be used to detect the moving object. The frame difference method calculates a difference between an image before one to several frames and the current frame image to detect a moving object region. The background difference method calculates a difference between the current frame image and the previous background image to detect a moving object region.

When the number of moving object regions is one or more ("Y" in 1007), the retrieval data registration thread extracts image features from the detected moving object regions (1008). In order to calculate the image features of the moving object regions, all image features based on color information may be extracted from the detected regions. Specifically, the detected region is divided into a lattice, and color histograms corresponding to the divided regions are generated. Then, a multi-dimensional vector generated from the color histogram is used as the image features. Alternatively, in addition to the color information, information, such as a luminance value and a brightness value, or a combination of a color, the luminance value, and the brightness value may be used as the image features.

Then, the retrieval data registration thread determines whether the number of face regions or the number of moving object regions is one or more (1009). If it is determined that neither the face region nor the moving object region is detected ("N" in 1009), the retrieval data registration thread determines that the detected event is invalid, and returns to Step 1001, without registering the image feature, to acquire the next image. On the other hand, if it is determined that the number of face regions or the number of moving object regions is one or more ("Y" in 1009), the retrieval data registration thread transmits a request of registration of data for retrieval (2001 in FIG. 5) including the image features of the detected regions to the search program 21 (1010).

As described above, when an event is detected by a motion component, but no face region and/or no moving object region is detected and no image feature is extracted, no request of registration of data for retrieval is transmitted to the search program 21. Therefore, it is possible to reduce the load of a search system.

In the retrieval data registration process shown in FIG. 4, both the face region and the moving object region are detected. However, one of the face region and the moving object region may be detected and an image feature may be extracted from the detected region.

Figure 5:
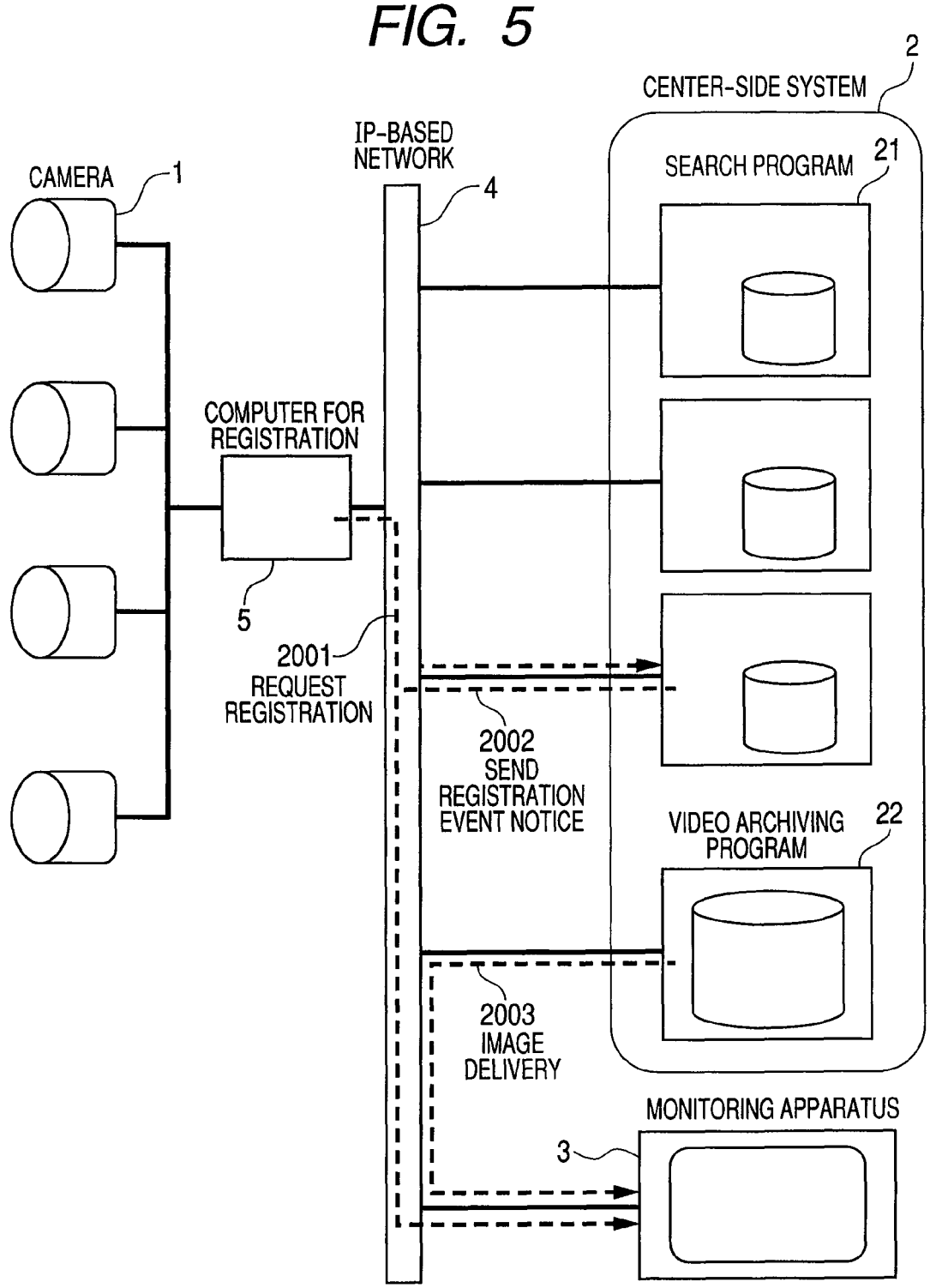
FIG. 5 is a diagram illustrating the operation of the video surveillance system according to the first embodiment of the invention.

FIG. 5 is a diagram illustrating the operation of the video surveillance system according to the first embodiment of the invention.

When an event is detected from the image captured by the camera 1, the computer for registration 5 transmits the request of registration of data for retrieval 2001 to the search program 21.

When receiving the request of registration of data for retrieval 2001 from the computer for registration 5 (211 in FIG. 4), the search program 21 stores the received retrieval data in the storage device (212 in FIG. 4). Then, the search program transmits to the monitoring apparatus 3 a registration event notice 2002 indicating that new data has been registered together with the identifier of the registration data.

The monitoring apparatus 3 determines the importance of image data related to the received retrieval data. If it is determined that the importance of the image data related to the received retrieval data is high, the monitoring apparatus transmits an image transmission request including the identifier of the image data to the video archiving program 22.

When receiving the image transmission request, the video archiving program 22 transmits the latest image of the camera 1 corresponding to the identifier of the received image data to the monitoring apparatus 3, which is a request source (2003).

The monitoring apparatus 3 displays the image data received from the video archiving program 22 as a moving picture.

As described above, in the first embodiment of the invention, the computer for registration 5 generates retrieval data from the image captured by the camera 1, and transmits the generated retrieval data to the search program 21. The search program stores the retrieval data received from the computer for registration 5 in the storage device, and transmits an event indicating that the retrieval data has been stored to the monitoring apparatus 3. The video archiving program 22 requests the computer for registration 5 to transmit the image data captured by the camera 1 at a predetermined timing. The computer for registration 5 transmits the image captured by the camera 1 in response to the request from the video archiving program 22.

Therefore, the video surveillance system including plural cameras can achieve an appropriate load distribution. The load distribution makes it possible to improve the scalability of a system without increasing the load of the system and the load of the network even when the number of cameras increases and thus the number of apparatuses (servers and computers) of the system increases.

Further, since high-resolution moving picture data is transmitted to the monitoring apparatus 3 if necessary, it is possible to prevent an increase in the load of the network. In addition, since the video archiving program 22 controls the transmission timing of the high-resolution moving picture data to the video archiving program 22, it is possible to prevent an increase in the load of the network.

The monitoring apparatus 3 determines the necessity (importance) of an image related to the retrieval data received from the search program 21, and requests the video archiving program 22 to transmit the image related to the retrieval data if it is determined that the image related to the received retrieval data is needed. The video archiving program 22 transmits the requested image data to the monitoring apparatus 3, which is a request source, in response to the image transmission request from the monitoring apparatus 3. The monitoring apparatus 3 displays the image data acquired from the video archiving program 22.

Therefore, it is possible to seamlessly display history information (the past image data) and real-time information (the current image data) without increasing the load of an IP-based network.

The camera-side computer for registration 5 performs face detection and moving object detection to narrow down the range of frame images to be searched. Therefore, it is possible to reduce the amount of information collected to the search program, and thus reduce the load of the search program 21.

The camera-side computer for registration 5 extracts an image feature. Therefore, it is possible to reduce the load of the search program 21.

The computer for registration 5 processing the image data captured by the camera 1 is provided separately from the camera 1. Therefore, it is possible to construct a system using inexpensive and low-performance cameras 1 sold on the market.

Second Embodiment

Figure 6:
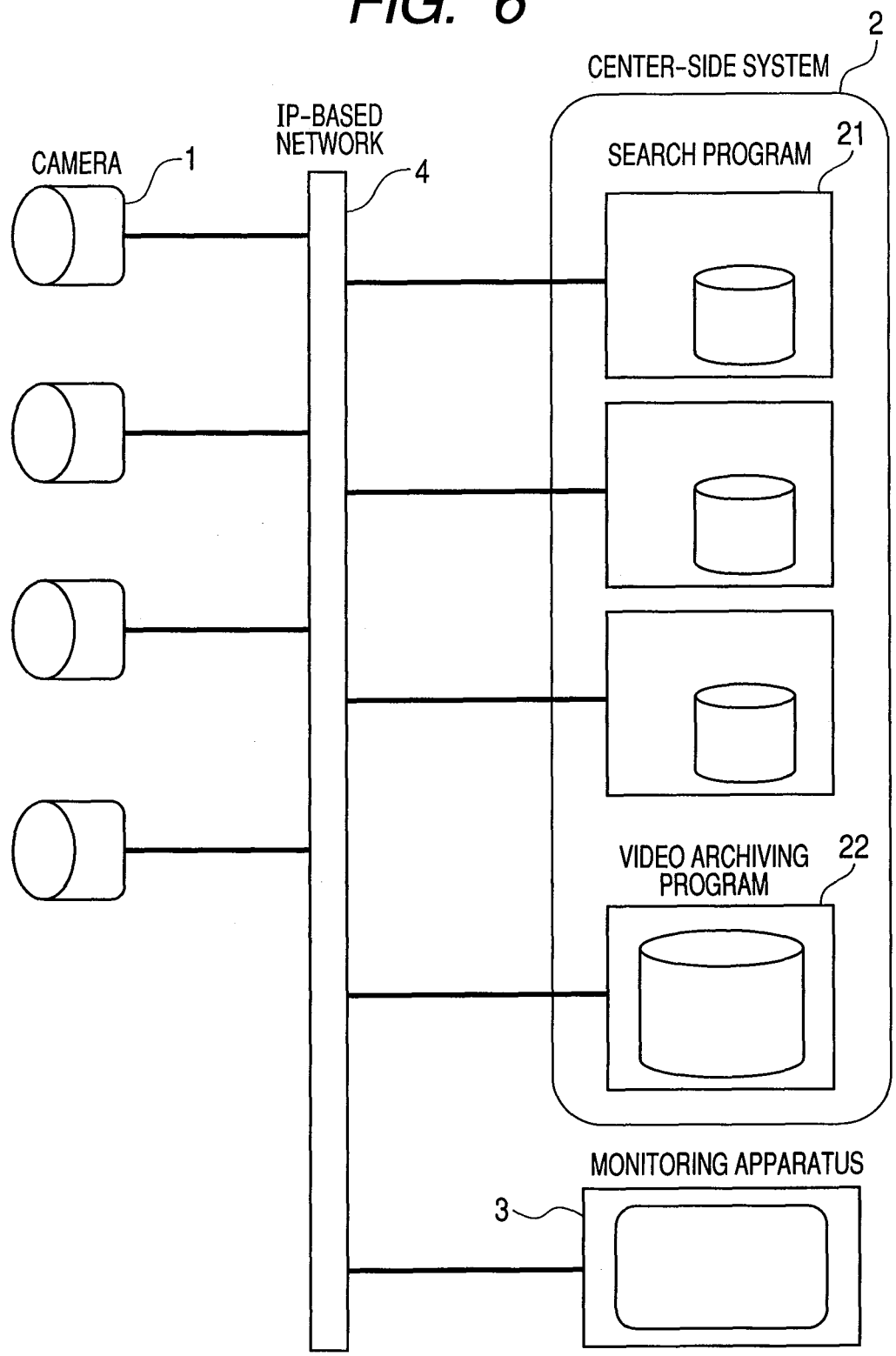
FIG. 6 is a block diagram illustrating the structure of a video surveillance system according to a second embodiment of the invention.

FIG. 6 is a block diagram illustrating the structure of a video surveillance system according to a second embodiment of the invention.

The second embodiment differs from the first embodiment in that it does not include the computer for registration 5. In the second embodiment, an image processing unit provided in the camera 1 has the same function as the computer for registration 5 in the first embodiment.

Specifically, the video surveillance system according to the second embodiment includes plural cameras 1, a center-side system 2, a monitoring apparatus 3, and an IP-based network 4.

The camera 1 includes an optical system including lenses, an imaging unit that converts an image into electric signals, an image processing unit that processes captured image data, and a network interface. For example, an IP camera that can be directly connected to an IP-based network may be used as the camera 1. The camera 1 is provided in an imaging target region, captures an image of the imaging target region, and transmits the captured image data to a video archiving program 22 through the IP-based network, in response to a high-resolution image request from the video archiving program 22.

The image processing unit of the camera 1 includes a processor and a memory, and extracts an image feature from the captured image data. A motion detecting technique or a face detecting technique may be used to extract the image feature from the image data of a predetermined motion or a predetermined face. In addition, the image processing unit of the camera 1 generates low-resolution image data from the captured image data. Then, the extracted image feature and the generated low-resolution image data are transmitted to the search program 21 through the IP-based network 4.

That is, instead of the computer for registration 5 according to the first embodiment, the image processing unit of the camera 1 executes the program for image registration 100 (see FIGS. 2 and 3).

The center-side system 2 and the monitoring apparatus 3 have the same functions as those in the first embodiment (FIG. 6). The video archiving program 22 according to the second embodiment transmits a high-resolution image request to the camera 1.

The cameras 1, the search programs 21, the video archiving program 22, and the monitoring apparatus 3 are connected to one another through the IP-based network 4. For example, an IP-based network that can transmit TCP/IP packets may be used as the IP-based network 4.

As described above, in the second embodiment of the invention, the camera 1 has the function of the computer for registration 5 (the image processing unit of the camera 1 has the same function as the computer for registration 5). Therefore, it is possible to further distribute the load of a system, as compared to the first embodiment, and thus improve the scalability of the system.

What is claimed is:
1. A video surveillance system comprising:
a plurality of cameras that capture images;
a display apparatus that displays the images captured by the cameras;

an information generating apparatus that generates information for searching the images captured by the cameras;

a search apparatus that searches the images captured by the cameras; and an image storage apparatus that stores the images captured by the cameras, wherein the information generating apparatus acquires the images captured by the cameras, generates retrieval data from the acquired images, and when an event is detected, transmits the generated retrieval data to the search apparatus, wherein image features are used as the retrieval data, wherein the search apparatus stores the retrieval data received from the information generating apparatus in a storage device, searches the retrieval data of the acquired images in the image storage apparatus, and transmits, to the display apparatus, the stored retrieval data, a registration event notice indicating that the retrieval data has been registered together with an identifier of the retrieval data registered, and results of searching the stored retrieval data, wherein the display apparatus receives the retrieval data and the identifier of the retrieval data registered, determines whether an image related to the retrieval data is required based on the retrieval data received from the search apparatus, and transmits an image transmission request to the image storage apparatus to transmit the image related to the retrieval data when determining that the image related to the retrieval data is required, wherein the image storage apparatus transmits the requested image data to the display apparatus, which is a request source, in response to the image transmission request from the display apparatus, and wherein the display apparatus displays the image data acquired from the image storage apparatus.

2. The video surveillance system according to claim 1, wherein the image storage apparatus requests the information generating apparatus to transmit the images captured by the cameras in a predetermined timing, and wherein the information generating apparatus transmits the images captured by the cameras in response to the image transmission request from the image storage apparatus.

3. The video surveillance system according to claim 2, wherein the image storage apparatus adjusts the time interval of the images acquired from the information generating apparatus based on information included in the images acquired from the information generating apparatus, and stores the acquired images in a storage device.

4. The video surveillance system according to claim 1, wherein the information generating apparatus detects a motion component from the image captured by the camera, and wherein, when no motion component is detected, the information generating apparatus does not transmit the retrieval data to the search apparatus.

5. The video surveillance system according to claim 1, wherein the information generating apparatus detects a face region from the image captured by the camera, and wherein, when no face region is detected, the information generating apparatus does not transmit the retrieval data to the search apparatus.

6. The video surveillance system according to claim 5, wherein the information generating apparatus detects the face region from the image captured by the camera and extracts an image feature of the detected face region, wherein the information generating apparatus detects a moving object region from the image captured by the camera, and extracts an image feature of the detected moving object region, and wherein the information generating apparatus uses the extracted image features as the retrieval data.

7. The video surveillance system according to claim 6, wherein, when a motion component is detected from the image captured by the camera, the information generating apparatus detects the face region and the moving object region, and wherein, when the motion component is detected, but neither the face region nor the moving object region is detected, the information generating apparatus does not transmit the retrieval data to the search apparatus.

8. The video surveillance system according to claim 1, wherein the information generating apparatus is connected to some of the plurality of cameras, and generates information for searching the images captured by the connected cameras.

9. The video surveillance system according to claim 1, wherein the information generating apparatus is formed integrally with the cameras, and generates information for searching the images captured by the integrated cameras.

10. A video data management method in a video surveillance system including a plurality of cameras that capture images, a search apparatus that searches the images captured by the cameras, an information generating apparatus that generates information for searching the images captured by the cameras, an image storage apparatus that stores the images captured by the cameras, and a display apparatus that displays the images captured by the cameras, the method comprising:

requesting, by the image storage apparatus, the information generating apparatus to transmit the images captured by the cameras in a predetermined timing;

transmitting, by the information generating apparatus the images captured by the cameras in response to the image transmission request from the image storage apparatus;

acquiring, by the information generating apparatus, the images captured by the cameras, generating retrieval data from the acquired images, and when an event is detected, transmitting the generated retrieval data to the search apparatus, wherein image features are used as the retrieval data;

storing, by the search apparatus, the retrieval data received from the information generating apparatus, searching the retrieval data of the acquired images in the image storage apparatus, and transmitting, to the display apparatus, the stored retrieval data, a registration event notice indicating that the retrieval data has been registered together with an identifier of the retrieval data registered, and results of searching the stored retrieval data;

receiving, by the display apparatus, the retrieval data and the identifier of the retrieval data registered;

determining, by the display apparatus, whether an image related to the retrieval data is required based on the retrieval data received from the search apparatus, and transmitting an image transmission request to the image storage apparatus to transmit the image related to the retrieval data when determining that the image related to the retrieval data is required;

transmitting, by the image storage apparatus, the requested image data to the display apparatus, which is a request source, in response to the image transmission request from the display apparatus; and displaying, by the display apparatus, the image data acquired from the image storage apparatus.

* * * * *